United States Patent
Ikegami

(10) Patent No.: US 10,185,735 B2
(45) Date of Patent: Jan. 22, 2019

(54) DISTRIBUTED DATABASE SYSTEM AND A NON-TRANSITORY COMPUTER READABLE MEDIUM

(71) Applicants: Kabushiki Kaisha Toshiba, Minato-ku (JP); TOSHIBA SOLUTIONS CORPORATION, Kawasaki-shi (JP)

(72) Inventor: Michiyo Ikegami, Kawasaki (JP)

(73) Assignees: KABUSHIKI KAISHA TOSHIBA, Minato-ku (JP); TOSHIBA SOLUTIONS CORPORATION, Kawasaki-shi (JP)

(*) Notice: Subject to any disclaimer, the term of this patent is extended or adjusted under 35 U.S.C. 154(b) by 945 days.

(21) Appl. No.: 14/572,837

(22) Filed: Dec. 17, 2014

(65) Prior Publication Data

US 2015/0100545 A1    Apr. 9, 2015

Related U.S. Application Data

(63) Continuation of application No. PCT/JP2013/000265, filed on Jan. 22, 2013.

(30) Foreign Application Priority Data

Jun. 22, 2012    (JP) ................................ 2012-140718

(51) Int. Cl.
G06F 17/30    (2006.01)

(52) U.S. Cl.
CPC .. G06F 17/30353 (2013.01); G06F 17/30557 (2013.01)

(58) Field of Classification Search
USPC ................................ 707/610, 652, 966, 625
See application file for complete search history.

(56) References Cited

U.S. PATENT DOCUMENTS 5,787,262 A * 7/1998 Shakib ...................... G06F 9/52
                                                             707/999.008
6,098,078 A * 8/2000 Gehani ............. G06F 17/30575
                                                             707/610

(Continued)

FOREIGN PATENT DOCUMENTS

JP     H08-115247 A1    5/1996
JP     H11-219309 A1    8/1999

(Continued)

OTHER PUBLICATIONS

International Search Report dated Apr. 2, 2013 for PCT/JP2013/000265 filed Jan. 22, 2013 with English Translation.

(Continued)

*Primary Examiner* — Cheyne D Ly
(74) *Attorney, Agent, or Firm* — Oblon, McClelland, Maier & Neustadt, L.L.P.

(57) ABSTRACT

A distributed database system accesses data by using management information managed by another data store, and accelerates a timing to update a data record having high access frequency. Thereby the latest data can be easily acquired. A distributed database system according to one embodiment comprises a distributed database including a plurality of nodes that stores data, and a data management device that manages the data stored in the plurality of nodes. Each of the nodes comprises a data storage unit that stores the data related to a time stamp representing a time when the data is stored and a key identifying the data, a data update unit that updates the data, a data sending unit acquires the data stored in the data storage unit, and a data update promotion unit that requests the data update unit to update the acquired data when the acquired data is not latest data.

2 Claims, 15 Drawing Sheets

(56) References Cited

U.S. PATENT DOCUMENTS

| | | | |
|---|---|---|---|
| 6,286,004 B1* | 9/2001 | Yoshiura | G06F 17/30371 |
| | | | 707/615 |
| 6,934,717 B1* | 8/2005 | James | G06F 17/30067 |
| 7,899,783 B1* | 3/2011 | Xu | G06F 17/30353 |
| | | | 707/613 |
| 8,972,491 B2* | 3/2015 | Abu-Libdeh | H04L 41/5096 |
| | | | 709/203 |
| 2006/0230099 A1 | 10/2006 | Maya et al. | |
| 2007/0256049 A1* | 11/2007 | Delvat | G06F 9/465 |
| | | | 717/104 |
| 2008/0052322 A1* | 2/2008 | Gusciora | G06F 17/30575 |
| 2013/0311488 A1* | 11/2013 | Erdogan | G06F 17/30353 |
| | | | 707/752 |

FOREIGN PATENT DOCUMENTS

| | | |
|---|---|---|
| JP | 2005-250521 A1 | 9/2005 |
| JP | 2006-293593 A1 | 10/2006 |

OTHER PUBLICATIONS

Written Opinion dated Apr. 2, 2013 for PCT/JP2013/000265 filed Jan. 22, 2013.
Combined Office Action and Search Report dated Sep. 28, 2016 in Chinese Patent Application No. 201380032942.1 with English translation.

\* cited by examiner

FIG.4

MANAGEMENT INFORMATION STORAGE UNIT 204

205 206 207

| key | status | timestamp |
|---|---|---|
| keyA | committed | 5 |
| keyA | committed | 4 |
| keyB | committed | 5 |
| keyB | committed | 4 |

FIG.7

MANAGEMENT INFORMATION STORAGE UNIT — 204

205, 206, 207

| key | status | timestamp |
|---|---|---|
| keyA | locked | 6 |
| keyA | committed | 5 |
| keyA | committed | 4 |
| keyB | committed | 5 |
| keyB | committed | 4 |

FIG.8

DATA STORAGE UNIT 105B

| key | value(timestamp : val) |
|---|---|
| keyA | 6 :valAAA |
| keyA | 5 :valAA |
| keyA | 4 :valA |
| keyB | 5 :valBB |
| keyB | 4 :valB |

MANAGEMENT INFORMATION STORAGE UNIT 204

205 — key | 206 — status | 207 — timestamp

| key | status | timestamp |
|---|---|---|
| keyA | committed | 6 |
| keyA | committed | 5 |
| keyA | committed | 4 |
| keyB | committed | 5 |
| keyB | committed | 4 |

FIG.10

MANAGEMENT INFORMATION STORAGE UNIT — 204

205 206 207

| key | status | timestamp |
|---|---|---|
| keyA | locked | 6 |
| keyA | committed | 5 |
| keyA | committed | 4 |
| keyB | locked | 7 |
| keyB | committed | 6 |
| keyB | committed | 5 |

FIG.11

105B DATA STORAGE UNIT

| key 106 | value(timestamp : val) 107 |
|---|---|
| keyA | 6 :valAA−α |
| keyA | 5 :valAA |
| keyA | 4 :valA |
| keyB | 7 :valBB+α |
| keyB | 6 :valBB |
| keyB | 5 :valB |

FIG.12

MANAGEMENT INFORMATION STORAGE UNIT 204

| key (205) | status (206) | timestamp (207) |
|---|---|---|
| keyA | committed | 6 |
| keyA | committed | 5 |
| keyA | committed | 4 |
| keyB | committed | 7 |
| keyB | committed | 6 |
| keyB | committed | 5 | ized and managed in a plurality of node
DISTRIBUTED DATABASE SYSTEM AND A NON-TRANSITORY COMPUTER READABLE MEDIUM

CROSS-REFERENCE TO RELATED APPLICATION

This application is a continuation application of PCT application Serial No. PCT/JP2013/000265, filed on Jan. 22, 2013, based upon and claims the benefit of priority from Japanese Patent Application No. 2012-140718, filed on Jun. 22, 2012; the entire contents of which are incorporated herein by reference.

FIELD

Embodiments of the present invention relate to a distributed database system and a non-transitory computer readable medium.

BACKGROUND

In general, in a distributed database system called as a data store, for the purpose of acceleration of processing, data is distributively saved and managed in a plurality of node devices. Hereinafter, a node device to save the data is called a data storage node, which is described as a node.

As to which data is stored in which node, a pair of data identification information (assigned to each data) and a storage destination node are saved and managed by a server or a node (each having data management function).

In this distributed database system, a copy of the same data record is stored in a plurality of nodes. As a result, each node can send the data in response to a request from a client terminal or a system, respectively. Accordingly, a large number of accesses to the same data record can be distributively processed.

In this case, when a value of some data record stored in one node is updated, if the value of the same data record stored in another node is simultaneously updated, merit due to distribution of access is disturbed. Accordingly, this simultaneous update in another node is not performed. Usually, after a value of some data record in one node is updated, a value of the same data record stored in another node is replaced by orderly propagating the value from the one node using a protocol for data exchange.

Accordingly, when a value of one data record is updated (replaced) with the latest value, it takes a time to some extent until the value of this data record stored in all related nodes is updated with the latest value. As a result, before the value of this data record stored in all nodes is updated, a client terminal or a system accessing this data record possibly acquires old value (not the latest value).

Furthermore, when an application acquires the value of the data record while this data record is being updated, even if the value is updated just after acquisition of the value, the application cannot know this updated value.

BRIEF DESCRIPTION OF THE DRAWINGS

FIG. 4 is a view illustrating an example of management information stored in a management information storage unit of the distributed database system according to the present embodiment.

FIG. 7 is a view illustrating an example of the management information stored in the management information storage unit of the distributed database system according to the present embodiment.

FIG. 8 is a view illustrating an example of the data record stored in the data storage unit of the distributed database system according to the present embodiment.

FIG. 9 is a view illustrating an example of the management information stored in the management information storage unit of the distributed database system according to the present embodiment.

FIG. 10 is a view illustrating an example of the management information stored in the management information storage unit of the distributed database system according to the present embodiment.

FIG. 11 is a view illustrating an example of the data record stored in the data storage unit of the distributed database system according to the present embodiment.

FIG. 12 is a view illustrating an example of the management information stored in the management information storage unit of the distributed database system according to the present embodiment.

DETAILED DESCRIPTION

An object of the present invention is to provide a distributed database system for easily acquiring the latest data by managing data management information with another data store.

Specifically, in case of accessing data, when update of the data is required based on the management information, as to a data record having high access frequency, timing to update the data record is accelerated.

A distributed database system according to one embodiment comprises a distributed database including a plurality of nodes that stores data, and a data management device that manages the data stored in the plurality of nodes. Each of the nodes comprises a data storage unit that stores the data related to a time stamp representing a time when the data is stored and a key identifying the data, a data update unit that updates the data, a data sending unit acquires the data stored in the data storage unit, and a data update promotion unit that requests the data update unit to update the acquired data when the acquired data is not latest data. The data management device comprises a management information storage unit that stores management information including the key and the time stamp stored in the data storage unit, and a management information update unit that, when the data is updated, updates the management information of the updated data.

Hereinafter, a distributed database system of one embodiment will be explained by referring to drawings.

Figure 1:
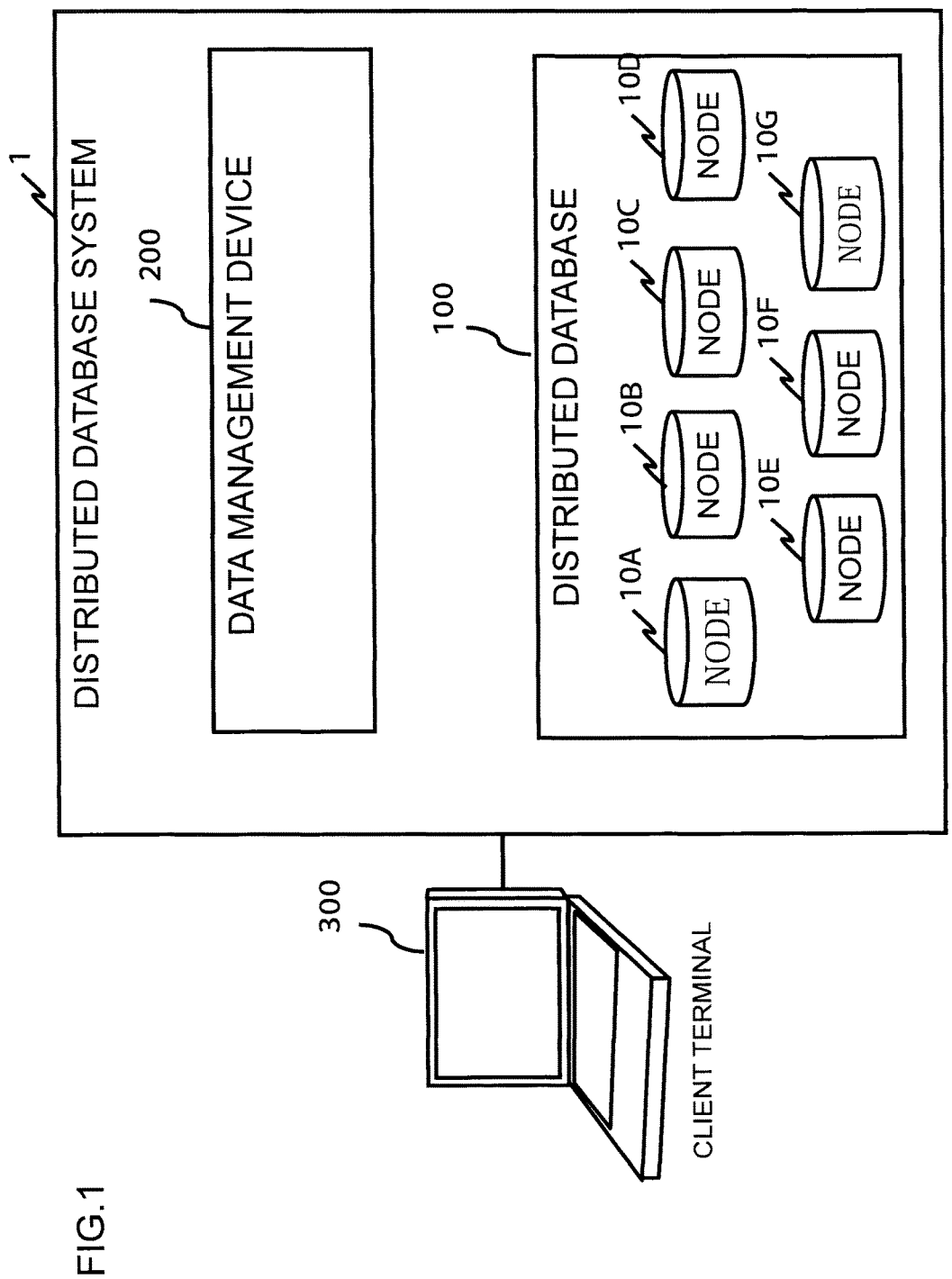
FIG. 1 is a view illustrating an exemplary configuration of a distributed database system according to a present embodiment.

FIG. 1 is a view illustrating an exemplary configuration of a distributed database system 1 having a database function to manage management information as another device, according to the present embodiment.

As shown in FIG. 1, the distributed database system 1 of the present embodiment is composed by a distributed database 100 and a data management device 200. The distributed database 100 is a database which simply collects a plurality of key-value elements as a combination of a value (data) and a key (ID) to identify the value. The data management device 200 manages data stored in the distributed database 100. Hereinafter, a set of the value and the key is called a data record.

The distributed database system 1 receives a request from a client terminal 300 or another system connected to the distributed database system 1. Moreover, in the distributed database system 1 of the present embodiment, the distributed database 100, the data management device 200 and the client terminal 300 may be connected via a network such as an Internet. Furthermore, in this embodiment, the distributed database 100, the data management device 200 and the client terminal 300, are respectively one unit. However, the number thereof is not limited to one. For example, the distributed database system including a plurality of the data management devices 200 or a plurality of the client terminals 300 can be composed.

The distributed database 100 includes data storage nodes 10 (10A, 10B, 10C, 10D, 10E, 10F, 10G), which is a database that a data record and the copy are distributively stored in these data storage nodes 10. Here, a plurality of data storage nodes 10 (Hereinafter, it is called a node) can exist except for 10A-10G. The respective nodes 10A-10G composing the distributed database 100 are connected any of other nodes 10, and can communicate with all nodes 10 composing the distributed database system 1.

The data management device 200 is an information processing device to manage of data records stored in the distributed database system 1. The data management device 200 is composed by a general database, which may not be the distributed database.

The client terminal 300 is, for example, a PC (personal computer), and inputs a request to the distributed database system 1.

Figure 2:
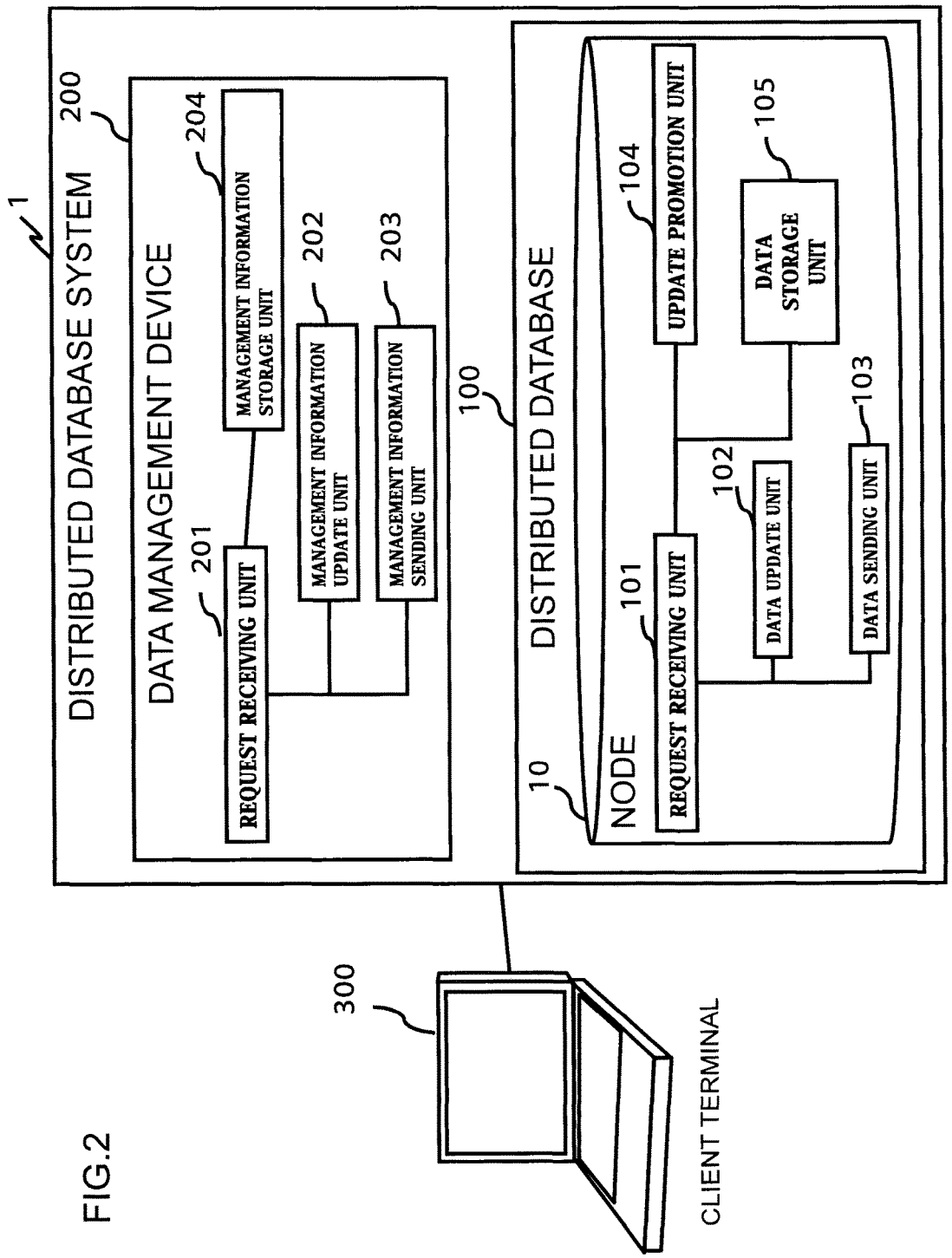
FIG. 2 is a view illustrating an exemplary functional configuration of the distributed database system according to the present embodiment.

FIG. 2 is a view illustrating an exemplary functional configuration of the distributed database system 1.

As shown in FIG. 2, for each node 10, the distributed database 100 includes a request receiving unit 101, a data update unit 102, a data sending unit 103, an update promotion unit 104, and a data storage unit 105. In FIG. 2, functional configuration of one node 10 is shown as a representation.

Figure 3:
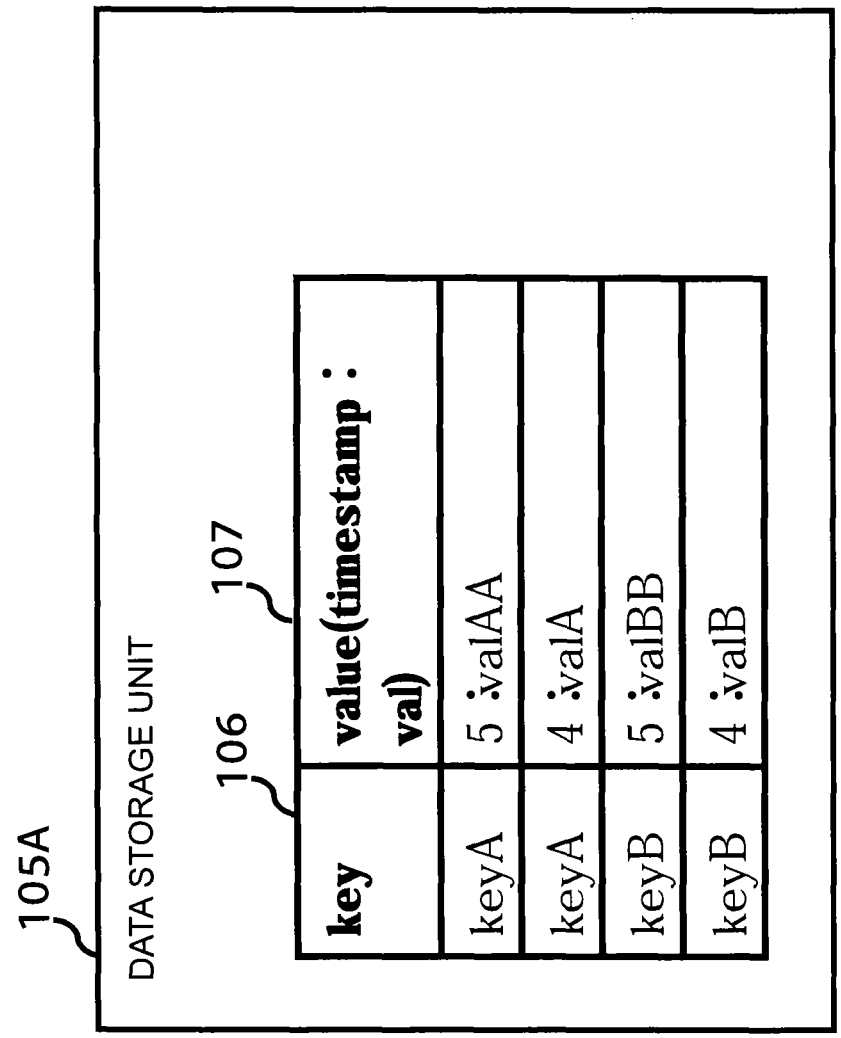
FIG. 3 is a view illustrating an example of a data record stored in a data storage unit of the distributed database system according to the present embodiment.

The request receiving unit 101 receives a request from the client terminal 300 or another node 10. The data update unit 102 updates data stored in the data storage unit 105 of the node 10 thereof. FIG. 3 shows one example of data record stored in the data storage unit 105 (Hereinafter, it is called a data storage unit 105A) of the node 10A.

As shown in FIG. 3, the data record stored in the data storage unit 105A includes "a key" 106 and "a value" 107. The key 106 is an identifier (ID) of the value 107.

As shown in FIG. 3, "keyA" and "keyB" are stored in the key 106. Hereinafter, a data record including keyA is called a data record A, and a data record including keyB is called a data record B.

Furthermore, a time stamp (representing a time when data is stored) and the data are stored in the value 107. For example, at the upper column of the value 107, "5:valAA" is stored. This means that the stored data is "valAA" and the time stamp (representing a time when the data is stored) is "5". Here, in the present embodiment, if a numerical value of the time stamp is larger, this represents that the data is updated at a later time. Namely, in the present embodiment, the time stamp represents an order that each data record is stored, and a data record of which time stamp is the largest numerical value is the latest data record.

Based on a request from the client terminal 300 or another node 10, the data sending unit 103 sends data stored in the data storage unit 105 of the node 10 thereof to a request source.

In response to a request from the client terminal 300 or another node 10, the update promotion unit 104 promotes update of the corresponding data.

The data management device 200 includes a request receiving unit 201, a management information update unit 202, a management information sending unit 203, and a management information storage unit 204. The data management device 200 is an information processing device to manage data records stored in the distributed database 100.

The request receiving unit 201 receives a request from the client terminal 300. The management information update unit 202 updates management information stored in the management information storage unit 204, based on the request received by the request receiving unit 201.

The management information sending unit 203 sends the management information stored in the management information storage unit 204, based on the request received by the request receiving unit 201. FIG. 4 shows one example of the management information stored in the management information storage unit 204.

As shown in FIG. 4, the management information includes three items of "key" 205, "status" 206, and "time stamp" 207.

The key 205 is an identifier of data record stored in each node 10, which is same as the key 106 stored in the data storage unit 105.

The status 206 represents an update status of the data stored in the data storage unit 105. In the present embodiment, the status 206 includes two types, i.e., "locked (being updated)" and "committed (completion of processing)".

As the time stamp 207, a time when the data record is stored in the data storage unit 207 is stored. When the data record is updated in data update processing (explained afterwards), this update time is stored as the time stamp 207.

In the distributed database system 1, by the identifier (stored in the key 106, the key 205) and the time stamp (stored in the value 107, the time stamp 207), both the data and the management information can be retrieved and acquired.

Hereinafter, by referring to FIG. 5~FIG. 15, one example of operation of the distributed database system 1 of the present embodiment will be explained. Main processing of the distributed database system 1 includes data update processing, data acquisition processing, and data update promotion processing.

Figure 5:
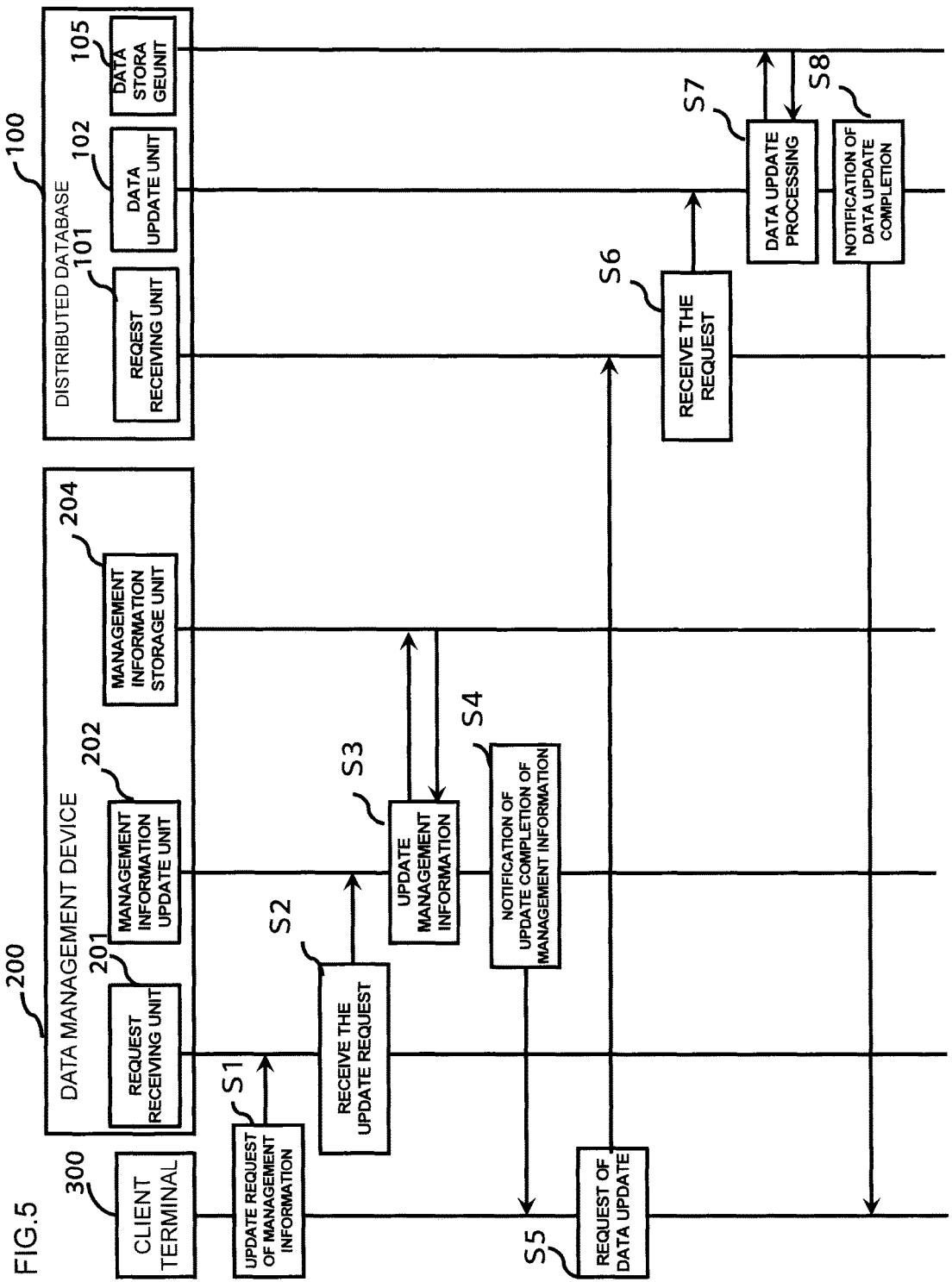
FIG. 5 is a sequence view illustrating an example of data update processing of the distributed database system according to the present embodiment.
Figure 6:
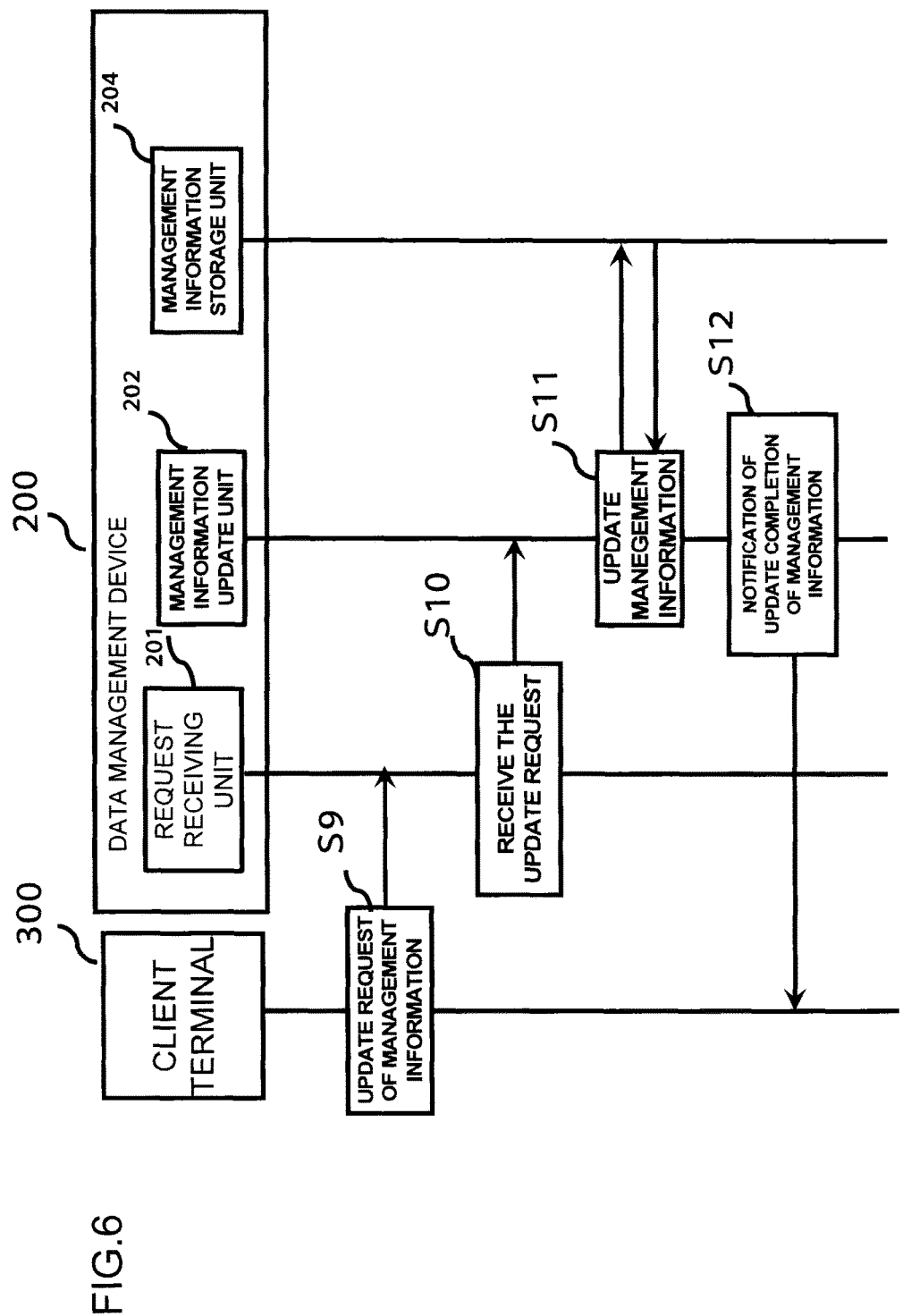
FIG. 6 is a sequence view illustrating an example of data update processing of the distributed database system according to the present embodiment.

First, by referring to FIG. 5 and FIG. 12, the data update processing of the present embodiment will be explained. FIG. 5 and FIG. 6 are sequence views of one example of the data update processing according to the distributed database system of the present embodiment. Here, in the distributed database system 1, the case that the key "keyA" and the value "6:valAAA" are inputted as a data record of update target from the client terminal 300 will be specifically explained.

Furthermore, here, one data record (data record A) stored in the data storage unit 105B of the node 10B is only updated.

First, the client terminal 300 sends an update request of management information including the key "keyA" (representing data record A of update target) and data "valAAA" (included in the data record A) to the data management device 200 (step S1). In the data management device 200, when the request receiving unit 201 receives the update request of management information, the request receiving unit 201 notifies the management information update unit 202 of the update request (step S2). Based on the update request of management information, the management information update unit 202 performs the first update processing to update the management information stored in the management information storage unit 204 (step S3).

Specifically, as shown in FIG. 7, the management information update unit 202 stores "keyA" (included in the received update request of management information) into the key 205, "6" (representing a time when the update request is received) into the time stamp 207, and "locked" (representing status of data record of update target) into the status 206, correspondingly. Here, the time stamp may be not inputted from the client terminal 300. For example, a maximum of time stamp related to data record A stored in the management information storage unit 204 is "5". Accordingly, the next numerical value "6" may be stored.

Namely, at step S3, a line represented by dots in FIG. 7 is added. Briefly, in the present embodiment, the update processing means not overwriting already-stored information but adding new management information.

When the first update processing is completed, the management information update unit 202 sends a first notification of update completion of management information to the client terminal 300 (step S4). When the client terminal 300 receives the first notification, the client terminal 300 sends a request of data update including the key "keyA" (representing data record of update target) and the value "6:valAAA" to the distributed database 100 (step S5).

Among a plurality of nodes 10 in the distributed database 100, when the request receiving unit 101 in one node 10 receives the request of data update (step S6), the data update unit 102 performs data update processing to update data stored in the data storage unit 105, based on "keyA" (representing data record of update target) and "valAAA" as data to be updated (step S7). Here, the node 10B receives the request of data update.

Specifically, as shown in FIG. 8, as the data record A, "keyA" is added to the key 106 and "6:valAAA" is added to the value 107, correspondingly. Here, a value of data record A in another node 10 of the distributed database 100 is not updated simultaneously.

When update of the data record is completed, the data update unit 102 sends a notification of data update completion to the client terminal 300 (step 8).

When the client terminal 300 receives the notification of data update completion, the client terminal 300 sends an update request of management information to the data management device 200 (step S9). In the data management device 200, when the request receiving unit 201 receives the update request of management information (step S10), the management information update unit 202 performs the second update processing to update management information (related to the data record of update target) stored in the management information storage unit 204 (step S11). Specifically, as shown in FIG. 9, update status (stored at step S3) at the first line of the status 206 in the management information storage unit 204 is updated to "committed".

When the second update processing is completed, the management information update unit 202 sends a second notification of update completion of management information to the client terminal 300 (step S12). As a result, data update processing of the present embodiment is completed.

Next, by referring to FIG. 10~FIG. 12, in the case of updating the data storage unit 105B while consistency between at least two data records (data record A, data record B) is maintained (such as transaction processing), the data update processing will be explained.

In this case, at step S3, as shown in FIG. 10, the management information update unit 202 adds management information related to two data records (to be updated) to the management information storage unit 204. Here, as to the data record A, as shown in the first line of FIG. 10, "keyA" is added to the key 205, "6" is added to the time stamp 207, and "locked" is added to the status 206.

As to the data record B, as shown in the fourth line of FIG. 10, by the management information update unit 202, "keyB" is added to the key 205, "7" is added to the time stamp 207, and "locked" is added to the status 206.

Furthermore, at step S7, as shown in FIG. 11, as to the data record A in the data storage unit 105B, "keyA" is added to the key 106 and "valAA-α" with the time stamp "6" is added to the value 107 (the first line of FIG. 11). As to the data record B in the data storage unit 105B, "keyB" is added to the key 106 and "valBB+α" with the time stamp "7" is added to the value 107 (the fourth line of FIG. 11). Here, in the same way as updating one data record, values of the data records A and B in another node 10 of the distributed database 100 are not updated simultaneously.

At step S11, as shown in FIG. 12, "locked" (updated at step S3) of the status 206 of the data records A and B included in the management information storage unit 204 is changed to "committed".

Figure 14:
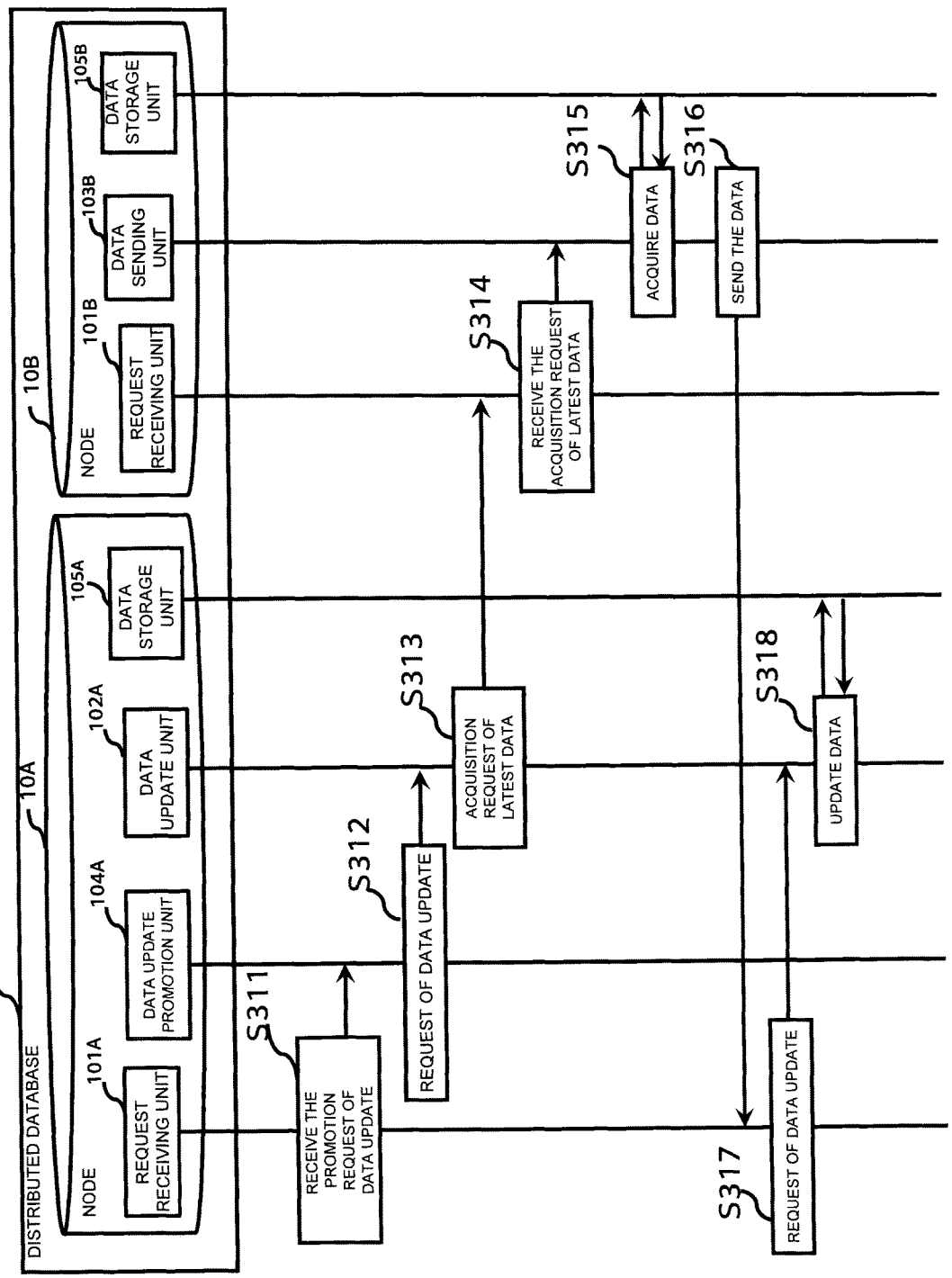
FIG. 14 is a sequence view illustrating an example of data update promotion processing of the distributed database system according to the present embodiment.
Figure 15:
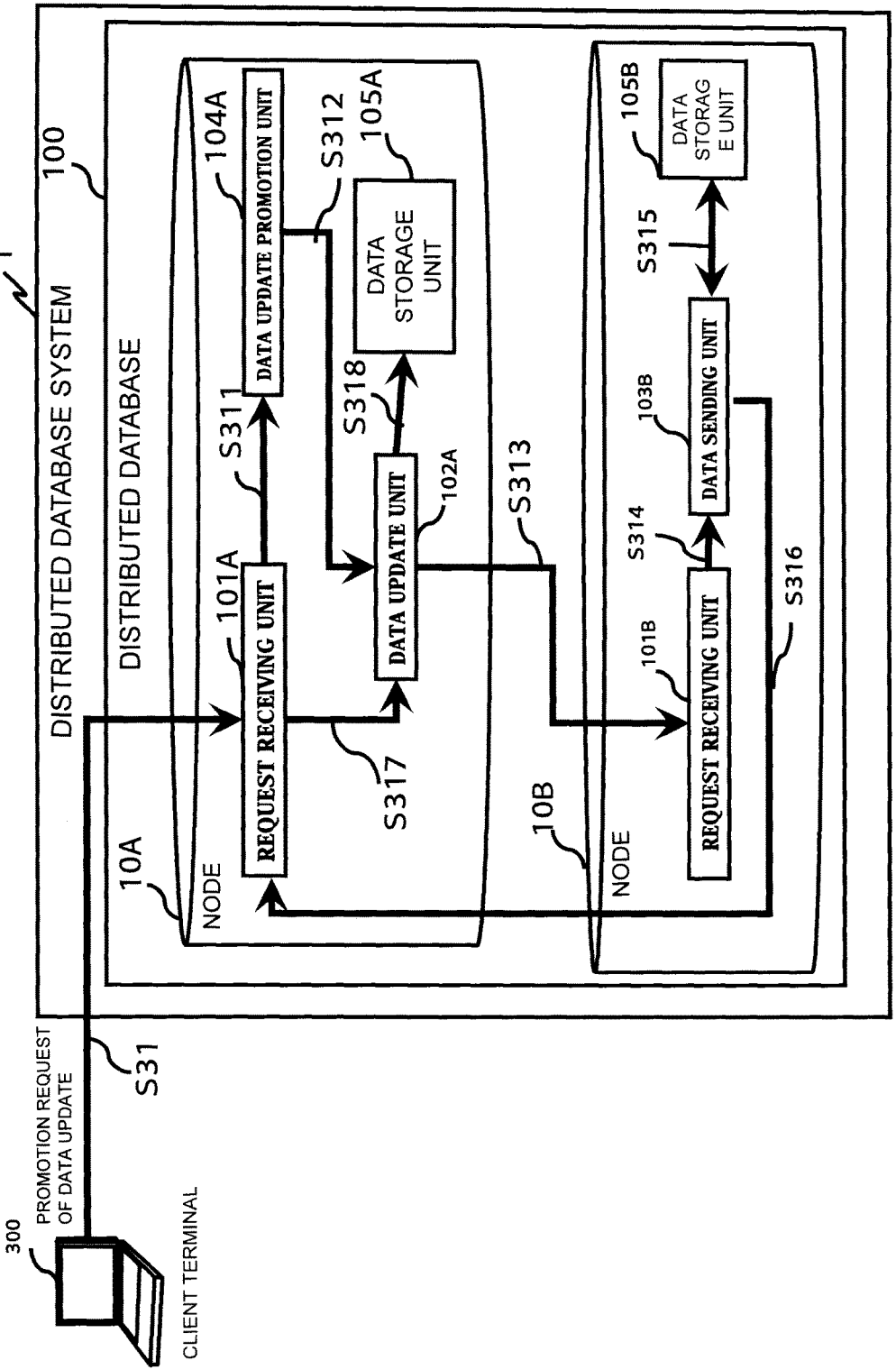
FIG. 15 is a schematic view illustrating detail of processing operation of the data update promotion processing of the distributed database system according to the present embodiment.

Next, by referring to FIG. 13-FIG. 15, in the distributed database system 1 of the present embodiment, data acquisition processing for the client terminal 300 to acquire data records stored in the distributed database 100 will be explained.

Figure 13:
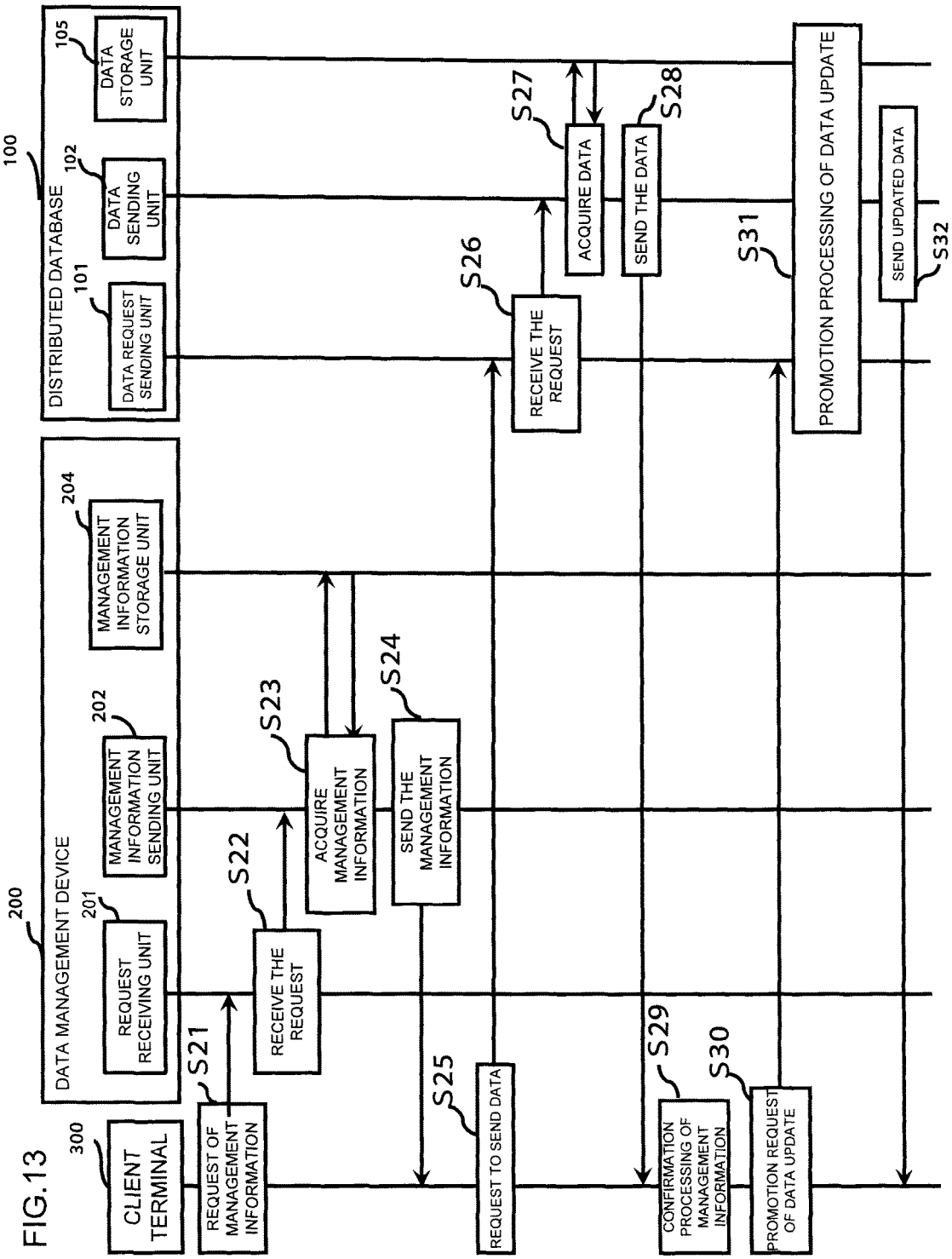
FIG. 13 is a sequence view illustrating an example of data acquisition processing of the distributed database system according to the present embodiment.

FIG. 13 shows a sequence view representing one example of data acquisition processing of the present embodiment. Hereinafter, by referring to FIG. 13, in the case that data records shown in FIG. 3 is stored in the data storage unit 105A of the node 10A, data records shown in FIG. 8 is stored in the data storage unit 105B of the node 10B, and management information shown in FIG. 9 is stored in the management information storage unit 204 of the data management device 204, data acquisition processing to acquire the data record A will be explained.

First, the client terminal 300 sends a request of management information related to a data record to be acquired, to the data management device 200 (step S21). In the data management device 200, when the request receiving unit 201 receives the request of management information (step S22), the management information sending unit 202 acquires management information (shown in FIG. 7) related to data record to be acquired, from the management information storage unit 204 (step S23).

The management information sending unit 202 sends the acquired management information to the client terminal 300 (step S24). In this case, among all management information acquired, the management information sending unit 202 may send management information having the largest numerical value stored in the time stamp 207, i.e., management information related to the latest data.

When the client terminal 300 receives the management information, the client terminal 300 sends a request to send data to the distributed database 100 (step S25).

Moreover, at step S25, by confirming management information received by the client terminal 300, in the case that the status corresponding to the latest time stamp (related to data record to be acquired) is "locked" or "committed", a user can decide whether to request to send data. Specifically, if the status corresponding to the latest time stamp (related to data record to be acquired) is "locked", data acquisition processing may be completed and restarted after predetermined time has passed. Here, status corresponding to the latest time stamp is "committed", and the data acquisition processing is continued.

Among nodes 10A~10G in the distributed database 100, when the request receiving unit 101 in one node 10 receives the request to send data (step S26), the data sending unit 102 acquires a data record having the latest time stamp among data records (to be acquired) from the data storage unit 105 (step S27).

In the present embodiment, assume that the node 10A receives the request to send data. Namely, at step S27, a data record having the latest time stamp "5" among data records stored in the data storage unit 105A is acquired. Here, if the data record A to be acquired is not stored in the node A, the data sending unit 102 transfers the request to another node, and the same processing is performed.

This transfer processing is performed by different methods, based on where a location information (representing which node 10 stores a data record A to be acquired) of the data record A is stored. For example, in a first transfer method, if the location information of the data record A is included in a request (to send data) sent by the client terminal 300, based on the location information of the data record A included in the request, the data sending unit 102 in the node 10A decides a saving destination node 10 of the data record A, and transfers the request to the destination node 10.

Furthermore, in a second transfer method, if the node 10A stores the location information of the data record A, the data sending unit 102 in the node 10A transfers the request (received by the node 10A), based on key value (stored therein) of the data record A.

Then, in a third transfer method, if the location information (representing a saving destination node 10) of the data record A is not stored in the request (to send data) sent by the client terminal 300 and the node A, the data sending unit 102 in the node 10A transfers the request to another (suitable) node 10 near the node 10A.

Here, if another node 10 which received the transferred request stores the location information of the data record A, the data sending unit 102 in another node 10 executes the second transfer method. On the other hand, if another node 10 does not store the location information of the data record A, the data sending unit 102 in another node 10 executes the third transfer method.

The sending unit 102 sends the data record (acquired) to the client terminal 300 (step S28).

The client terminal 300 performs management information-confirmation processing to compare a time stamp included in the data record (sent from the data sending unit 102 at step S28) with the latest time stamp included in the management information (sent at step S24) (step S29). Here, the latest time stamp included in the management information sent at step S24 is "6".

As a result of comparison, if the latest time stamp included in the management information (sent at step S24) is larger than the time stamp sent at step S28, i.e., if data sent at step S28 is old data, the client terminal 300 performs promotion processing of data update (step S30). In this case, a key representing a data record to be acquired and the latest time stamp sent at step S24 are included in a promotion request of data update.

In the present embodiment, the latest time stamp included in data records stored in the data storage unit 105A of the node A is "5", and the latest time stamp included in the management information sent at step S24 is "6". Accordingly, at step S30, promotion processing of data update is executed.

After receiving the promotion request of data update, the distributed database 100 performs the promotion processing of data update (step S31).

By referring to FIG. 14 and FIG. 15, promotion processing of data update at step S31 of FIG. 13 will be explained. FIG. 14 is a sequence view showing one example of promotion processing of data update according to the distributed database 100 of the present invention. FIG. 15 is a schematic diagram showing detail operation of promotion processing of data update according to the distributed database 100 of the present invention.

First, a request receiving unit 101 in the node 10A of the distributed database 100 receives the promotion request of data update (step S311).

When the request receiving unit 101A receives the promotion request of data update, the data update promotion unit 104A sends a request of data update to the data update unit 102A (step S312). When the data update unit 102A receives the request of data update, the data update unit 102A sends an acquisition request of latest data including a key (representing data record to be acquired) and the latest time stamp (sent at step S24), to another node 10 which stores the data record to be acquired (step S313). Here, assume that the acquisition request of latest data is sent to a node 10B.

When the request receiving unit 101B in the node 10B receives the acquisition request of latest data (step S314), the data sending unit 103B acquires a data record (hereinafter, it is called the latest data record) including a key (representing the data record to be acquired) and data (including the latest time stamp) from the data storage unit 105B (step S315). Moreover, at step S315, if the node 10B does not store the latest data record, the acquisition request of latest data is transferred to another node. Here, assume that the node 10B stores the latest data record.

The data sending unit 103B sends the latest data record (acquired at step S315) to the node 10A which sent the acquisition request of data update (step S316).

When the request receiving unit 101A receives the latest data record, the request receiving unit 101A requests the data update unit 102A of data update (step S317). The data update unit 102A performs data update by adding the latest data record (received) to the data storage unit 105A (step S318). As a result, the promotion processing of data update of the present embodiment is completed.

Here, we return to explanation of FIG. 13. After the promotion processing of data update of step S31 is completed, the distributed database 100 sends the updated data to the client terminal 300 (step S32), and the data acquisition processing is completed.

Moreover, as a result of comparison at step S29, if the latest time stamp sent at step S24 is equal to the time stamp sent at step S28, processing following from step S30 is not performed. Furthermore, after the client terminal 300 has executed the promotion processing of data update, the data acquisition processing of the present embodiment may be completed. After the promotion processing of data update, the client terminal may execute the data acquisition processing again and request a data record to be acquired.

As mentioned-above, according to the distributed database system 1 of the present embodiment, in the distributed database which manages data stored in a plurality of storage nodes, management information (such as the update status or time stamp of data records) can be managed by another database. As a result, even if the data record is being updated, management information of the same data record can be acquired.

Furthermore, in the distributed database system 1 of the present embodiment, in case of requesting data acquisition, by using the management information, the acquired data is confirmed whether to be the latest one. If the acquired data is not the latest one, the node which stores the acquired data is requested to update this data. As a result, as to a data record of which access frequency is high, a timing to update the data is accelerated. Accordingly, as to data of which access frequency is higher, the distributed database system which easily acquires newer data (the latest data) can be provided.

Furthermore, in the distributed database system 1 of the present embodiment, while a data record of data request target from the client terminal is being updated, execution of data request is delayed. By sending data after update of the data record is completed, the distributed database system which easily acquires the latest data (i.e., consistency of data is high) can be provided.

Confirmation processing of management information (step S29) in data acquisition processing may be executed by not the client terminal 300 of data sending destination but the data sending unit 103 after acquiring the data (after step S27). After that, the data sending unit 103 sends the updated latest data to the client terminal 300.

Furthermore, confirmation processing of management information (step S29) may be executed by the data management device 200. In this case, data sending destination at step S28 is not the client terminal 300 but the data management device 200. Here, the data management device 200 may equip a management information-confirmation unit to perform the confirmation processing of management information.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A distributed database system comprising: a distributed database including a plurality of nodes that stores data; and a data management device that manages the data stored in the plurality of nodes, wherein each of the nodes comprises
   a data storage unit that stores the data related to a time stamp representing a time when the data is stored, and a key identifying the data;
   a data update unit that updates the data;
   a data sending unit that, when a request to send data is received from a client terminal, acquires the data stored in the data storage unit; and
   a data update promotion unit that requests the data update unit to update the
   acquired data,
   wherein the data management device comprises
   a management information storage unit that stores a management information including the key and the time stamp stored in the data storage unit; and
   a management information update unit that, when the data is updated in the data storage unit of any of the plurality of nodes, updates the time stamp of the updated data in the management information to a latest time stamp, and
   wherein the data update promotion unit:
   based on a decision result whether the acquired data is latest data by using comparing the time stamp included in the acquired data with the latest time stamp of the acquired data stored in the management information storage unit, when the acquired data is not the latest data, acquires the latest data related to the latest time stamp from any other nodes in the plurality of nodes; and requests the data update unit to update the acquired data stored in the data storage unit with the latest data, wherein the management information storage unit stores the management information including an update status of the data stored in the data storage unit, the management information update unit, when the data storage unit receives an update request of the data, changes the update status to being updated, and, when update of the data is completed, changes the update status to completion, and the data sending unit does not acquire the data from the data storage unit while the update status is being updated.

2. A non-transitory computer readable medium that stores a program to be used in a distributed database system comprising
   a distributed database including a plurality of nodes that stores data in respective data storage units; and
   a data management device that manages the data stored in the plurality of nodes;
   a management information storage unit that stores a management information including the key and the time stamp stored in the data storage unit;
   a management information update unit that, when the data is updated in the data storage unit of any of the plurality of nodes, updates the time stamp of the updated data in the management information to a latest time stamp;
   a data sending unit that, when a request to send data is received from a client terminal, acquires the data stored in the data storage unit;
   the program causing a computer to function as:
   storing the data related to a time stamp representing a time when the data is stored, and a key identifying the data, into the data storage unit; updating the data;
   when a request to send data is received from a client terminal, acquiring the data stored in the data storage unit;
   requesting update of the acquired data;

storing a management information including the key and the time stamp stored in the data storage unit into a management information storage unit of the data management device; and when the data is updated in the data storage unit of any of the plurality of nodes, updating the time stamp of the updated data in the management information to a latest time stamp, wherein the requesting includes:

based on a decision result whether the acquired data is latest data by using comparing the time stamp included in the acquired data with the latest time stamp of the acquired data stored in the management information storage unit, when the acquired data is not the latest data, acquiring the latest data related to the latest time stamp from any other nodes in the plurality of nodes; and requesting update of the acquired data stored in the data storage unit with the latest data, wherein the management information storage unit stores the management information including an update status of the data stored in the data storage unit, the management information update unit, when the data storage unit receives an update request of the data, changes the update status to being updated, and, when update of the data is completed, changes the update status to completion, and the data sending unit does not acquire the data from the data storage unit while the update status is being updated.

* * * * *